United States Patent [19]
Burman et al.

[11] Patent Number: 5,697,632
[45] Date of Patent: Dec. 16, 1997

[54] WHEEL ALIGNMENT APPARATUS FOR USE ON A BEAM AXLE

[75] Inventors: Stephen M. Burman; Steven G. Goddard, both of Ft. Wayne, Ind.

[73] Assignee: Dana Corporation, Toledo, Ohio

[21] Appl. No.: 526,164

[22] Filed: Sep. 11, 1995

[51] Int. Cl.$^6$ ................................................ B62D 17/00
[52] U.S. Cl. ........................................ 280/661; 403/4
[58] Field of Search ........................ 280/661, 674; 403/3, 4

[56] References Cited

U.S. PATENT DOCUMENTS

| | | | |
|---|---|---|---|
| 2,065,071 | 12/1936 | Harris | 280/661 |
| 2,674,465 | 4/1954 | Carpezzi | 280/661 |
| 3,273,909 | 9/1966 | Müller et al. | 280/661 |
| 4,509,772 | 4/1985 | Drotar et al. | 280/661 |
| 4,595,216 | 6/1986 | Ware | 280/661 |
| 4,641,853 | 2/1987 | Spector et al. | 280/661 |
| 4,831,744 | 5/1989 | Spector et al. | 280/661 X |
| 4,836,574 | 6/1989 | Ingalls | 280/661 |
| 4,953,889 | 9/1990 | Reilly | 280/661 |
| 4,953,894 | 9/1990 | Broszat et al. | 280/623 |
| 5,538,273 | 7/1996 | Osenbaugh et al. | 280/661 |

*Primary Examiner*—Christopher P. Ellis
*Attorney, Agent, or Firm*—Oldham & Oldham Co., LPA

[57] ABSTRACT

The present invention relates to a mechanism for setting and adjusting wheel alignment parameters such as caster and camber on a driving or non-driving steerable beam axle. An enlarged bore is provided in at least one end of the yoke to receive a ramp member and a ball joint assembly sleeve. The ball joint assembly sleeve is movable relative to the ramp member along an arc defined by the curved surfaces of the ramp member such that the position of the ball joint assembly sleeve, and consequently the ball joint, may be varied within the bore. Depending upon the orientation of the curved surfaces of the ramp member, the present invention may be utilized to adjust either caster or camber. The present invention also relates to a method of adjusting the position of a ball joint relative to a yoke member.

15 Claims, 5 Drawing Sheets

WHEEL ALIGNMENT APPARATUS FOR USE ON A BEAM AXLE

FIELD OF INVENTION

This invention relates generally to steerable beam axles for motor vehicles, and more particularly to an adjustment mechanism that allows wheel alignment parameters, such as caster or camber, to be adjusted on a beam axle.

BACKGROUND OF THE INVENTION

Motor vehicles often employ a steerable front axle arrangement in which a yoke is fixedly attached to a beam axle with a steering knuckle pivotally attached to the yoke using upper and lower ball joints. The steering knuckle pivots about an axis of rotation referred to as the steering axis or kingpin axis. In the case of a driven, steerable axle, the yoke may be attached to a tubular axle housing that surrounds the driving axle shaft. Non-driven beam axles may also be formed of a tubular axle including a tube yoke fixedly attached to each end of the axle tube. In either case, the steering knuckle carries a spindle upon which a vehicle wheel and tire assembly is mounted for rotation. In response to control forces originating with the driver, the steering knuckle pivots relative to the yoke and axle to provide steering at the wheels.

Caster and camber wheel alignment parameters are critical to proper road handling and tire wear. Caster is conventionally defined as the angle, in a side elevational view of a vehicle, between the steering (or kingpin) axis and the vertical axis. Caster angle is important in vehicle suspensions because it causes the vehicle steering wheels to return to a straight ahead position following the negotiation of a curve. Camber is typically defined as the angle, when a vehicle is viewed in front elevation, between vertical and the centerline of the wheel. Camber influences primarily tire wear and cornering performance.

Heretofore, limited means have been available to adjust caster and camber on steerable beam-type axles. Often, the caster and camber are fixed at the time when the tube yoke is welded or otherwise attached to the axle tube. The tube yoke located at each wheel end must be attached to the axle tube such that the position of the tube yoke, which determines caster and camber, is within manufacturing tolerances. However, even though the tube yoke may be attached within the specified tolerances, tolerance "stack-up" may occur—i.e., the cumulative effect of slight intolerances in multiple components can cause a complex machine, such as a motor vehicle, to have specifications that fall outside of the desired range, even though each individual measurement is within specifications. Therefore, it is difficult and time consuming to provide a vehicle beam axle having the proper caster and camber settings at each wheel. Also, through use of a motor vehicle, the caster and camber measurements may change, resulting in the need to "align" the wheels of the vehicle to be within the tolerances specified by the vehicle manufacturer.

Prior solutions to setting and resetting caster or camber measurements on beam axles have not been satisfactory. There has therefore been found a need to provide a simple and effective mechanism by which the caster or camber of a vehicle wheel end assembly on a beam axle may be initially set and later adjusted.

SUMMARY OF THE INVENTION

The present invention is therefore directed to a steerable beam axle for a motor vehicle comprising an axle tube having a yoke member connected to at least one end thereof wherein the yoke member includes upper and lower yoke ears each including a bore formed therethrough. One of the bores is enlarged and a ball joint assembly sleeve for receiving and retaining a ball joint is movably positioned in the enlarged bore. At least one clamp member is provided for selectively securing said ball joint assembly sleeve in a fixed position within said bore.

DETAILED DESCRIPTION OF THE PREFERRED EMBODIMENT

Figure 1:
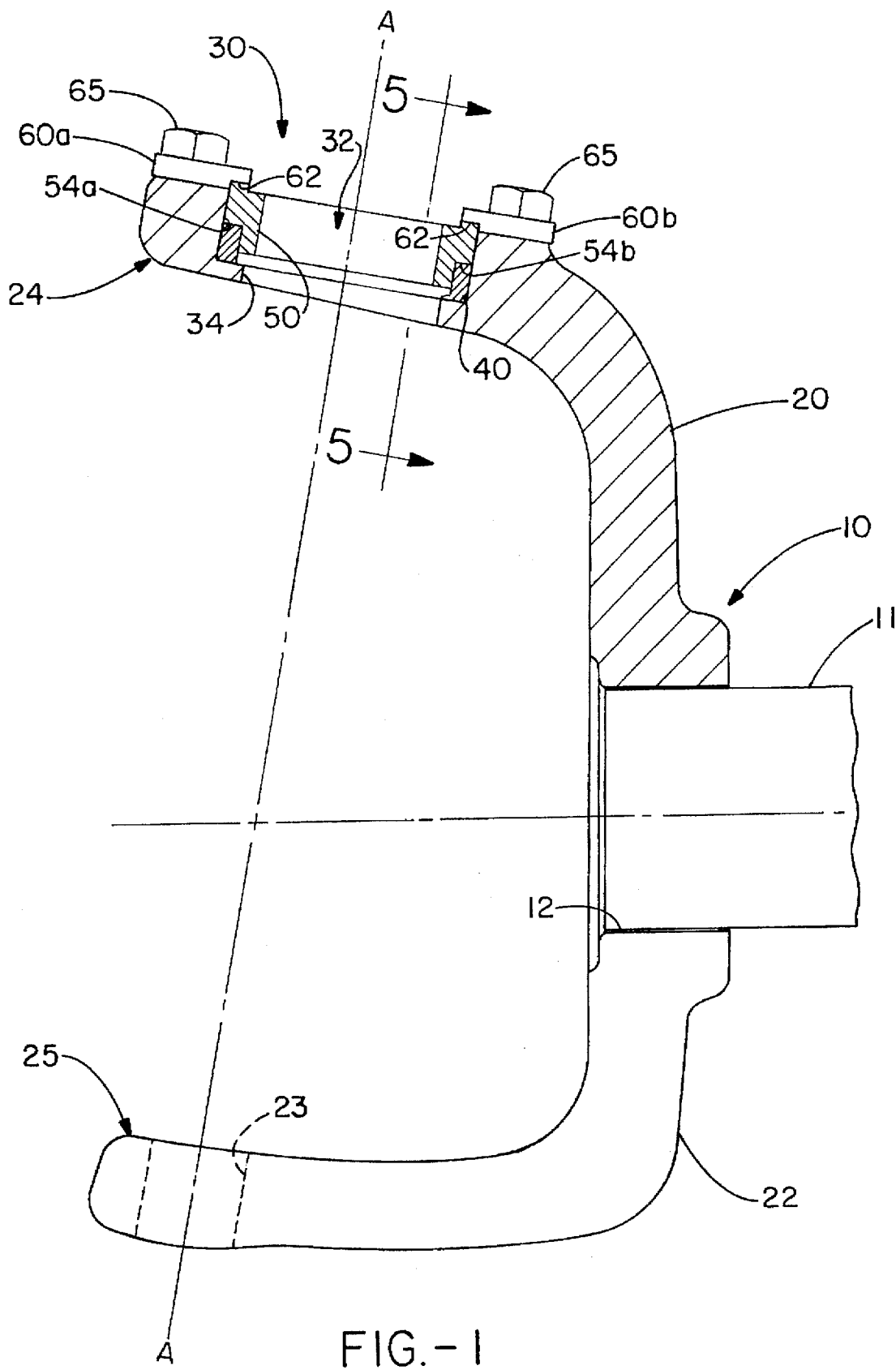
FIG. 1 is a front cross-sectional view of a tube yoke incorporating a preferred embodiment of the present invention.

Referring to FIG. 1, there is shown a robe yoke 10 incorporating a preferred embodiment of the wheel alignment mechanism of the present invention, generally shown at 30. Tube yoke 10 is designed to receive an axle robe 11 through bore 12 and be welded or otherwise fixedly attached to the axle robe 11. A steering knuckle 14 (shown partially in FIG. 7) is pivotally connected to robe yoke 10 using upper and lower ball joints (not shown) such that the steering knuckle 14 may pivot about a steering axis A in response to steering forces originating with the vehicle driver.

More specifically, robe yoke 10 includes an upper yoke ear 20 and a lower yoke ear 22 originating at opposite sides of bore 12 and traveling outward therefrom to provide distal region 25 of lower yoke ear 22 and distal region 24 of upper yoke ear 20 in a spaced apart relationship. Distal region 25 of lower yoke ear 22 includes a bore 23 formed therethrough such that a lower ball joint (not shown) may be received therein as is known in the art. As is shown in FIG. 1, distal region 24 upper yoke ear 20 includes the adjustment mechanism 30 as a part thereof such that an upper ball joint (not shown) may be connected to upper yoke ear 20 and properly positioned to adjust caster or camber as is discussed fully below. While as shown, the present invention 30 is incorporated into the upper yoke ear 20 as is thought preferable, those skilled in the art will recognize that the present invention 30 may likewise be incorporated into the lower yoke ear 22. Also, it is contemplated herein that the adjustment mechanism 30 could be incorporated into both the upper and lower yoke ears 20, 22 such that, for example, caster could be adjusted at one yoke ear 20, 22 and camber be adjusted at the other yoke ear 20, 22. Alternatively, either caster or camber adjustment could be provided at each yoke ear 20, 22 to allow a greater degree of adjustment to be attained.

Figure 2:
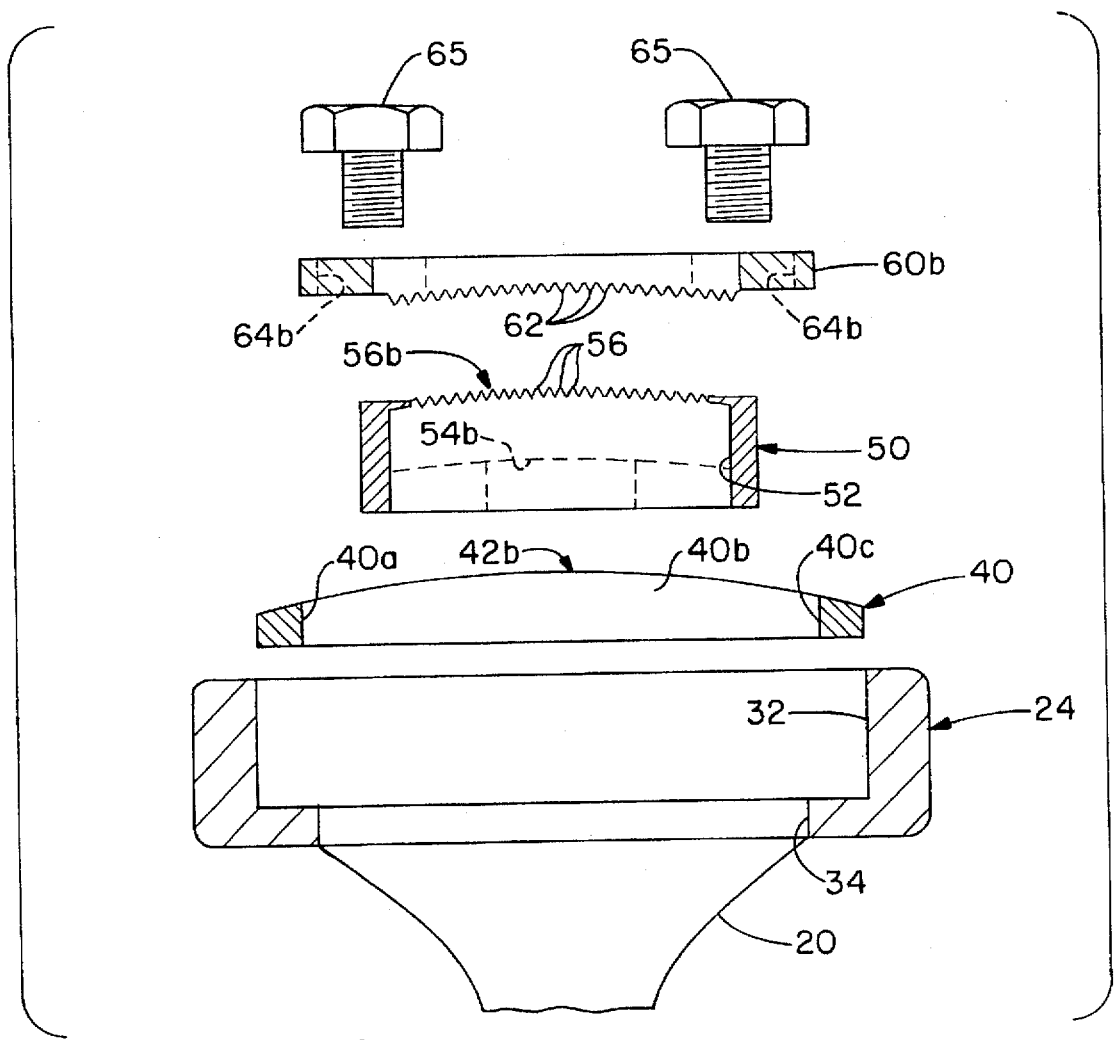
FIG. 2 is an exploded side view in cross-section of the present invention as it may be utilized to adjust the position of an upper ball joint.
Figure 3:
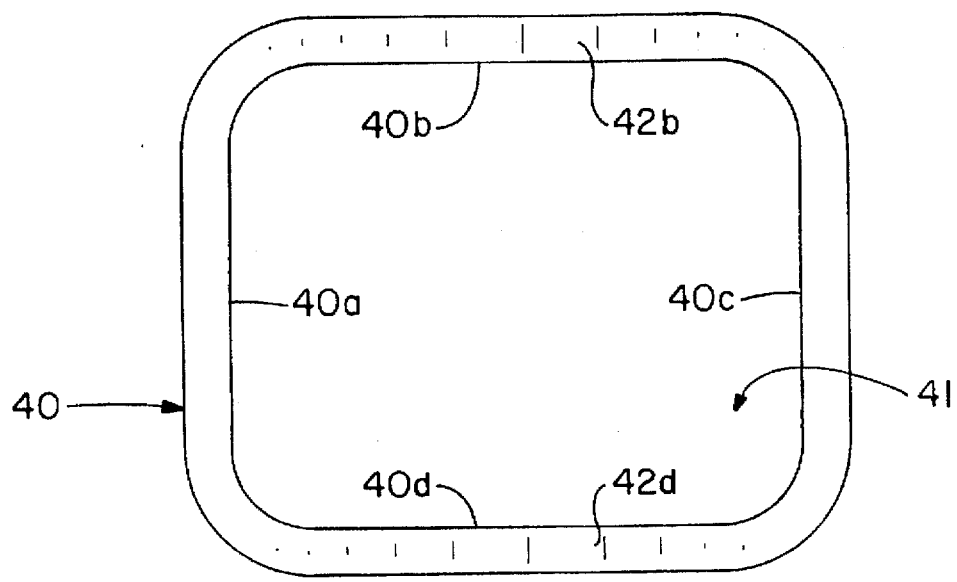
FIG. 3 is a top plan view of a ramp member in accordance with the present invention
Figure 5:
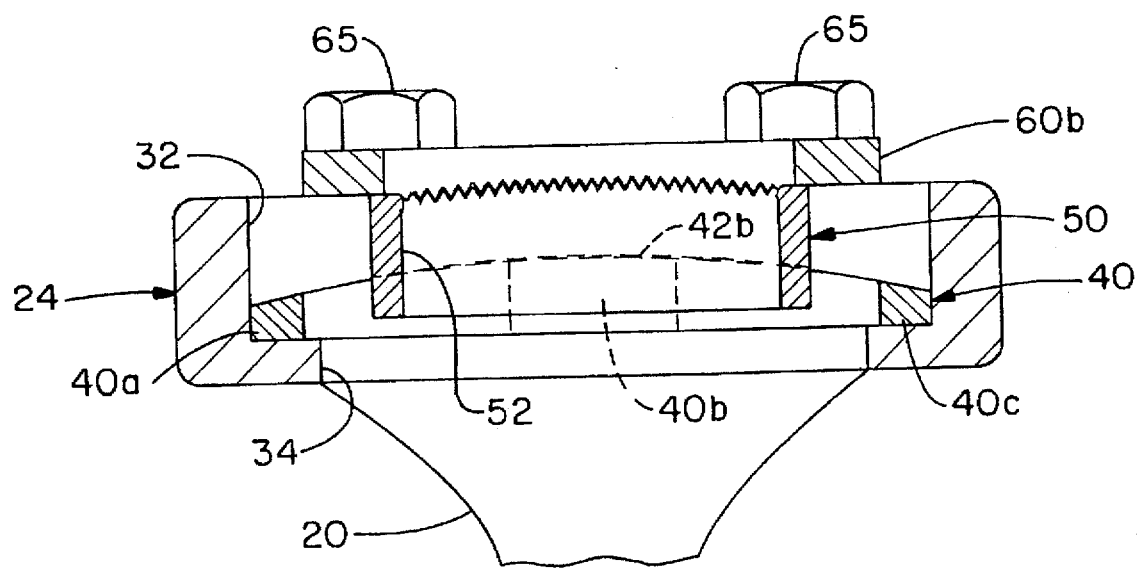
FIG. 5 is an enlarged cross sectional view along line 5—5 of FIG. 1.

Referring now also to FIG. 2, it can be seen that distal region 24 of upper yoke ear 20 is enlarged and includes a bore 32 formed therethrough. Bore 32 is preferably rectangular in shape and includes a step or flange 34. Bore 32 is designed to receive a ramp member 40 therein such that ramp member 40 is supported on flange 34. A preferred ramp member 40 is shown most clearly in FIGS. 2 and 3 wherein it can be seen that ramp member 40 comprises a rectangular member made up of four sections, 40a, 40b, 40c, and 40d, to form a frame-like member having an open central region 41. At least two opposing sections, 40b and 40d of ramp member 40 preferably include curved upper surfaces 42b and 42d the purpose of which is explained in detail below.

FIG. 2 also shows a ball joint assembly sleeve 50 designed to be inserted into bore 32 to rest upon curved upper surfaces 42b, 42d of ramp member 40. More specifically, sleeve 50 includes overhanging portions 53a, 53b, (FIGS. 1 and 4) respectively having curved lower surfaces 54a, 54b corresponding to and supported upon curved upper surfaces 42b, 42d of ramp member 40. Sleeve member 50 fits loosely in bore 32 such that sleeve 50 may be positioned at any point along curved surfaces 42b, 42d of ramp member 40. Alternatively, from the foregoing it can be see that the adjustment mechanism 30 may be utilized to adjust camber by providing curved upper surfaces on sections 40a, 40c of ramp member 40 and by reorienting ball joint assembly sleeve 50 to rest upon those surfaces. It will also be recognized from the foregoing that the location of ramp member 40 may be varied, or ramp member 40 may be formed as a one-piece construction with yoke member 10 in a suitable location to provide support for ball joint assembly sleeve 50.

Figure 4:
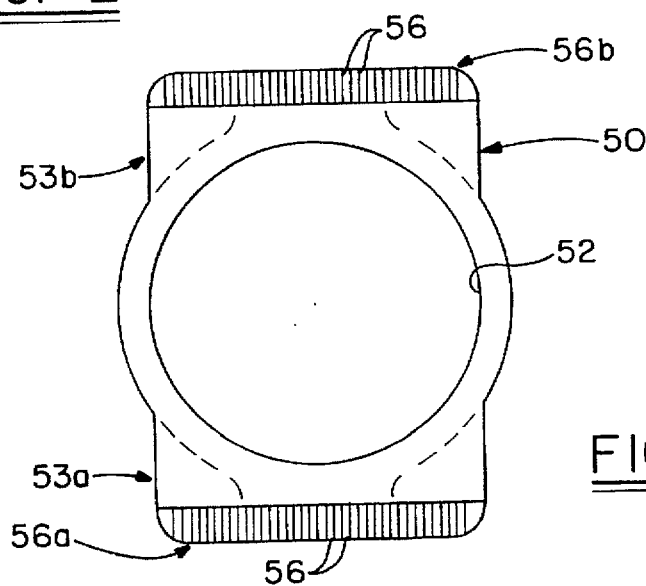
FIG. 4 is a top plan view of a ball joint assembly sleeve in accordance with the present invention.

In FIGS. 2 and 4, the preferred embodiment of ball joint assembly sleeve 50 may include teeth 56 extending upward therefrom. In the example shown, teeth 56 are formed in two spaced-apart rows 56a, 56b on the upper surface of overhanging regions 53a, 53b of ball joint assembly sleeve 50. Furthermore, teeth 56 are preferably formed in an arc along a curved upper region of sleeve 50 such that teeth 56 lie in an arc that is the same or similar to the arc of curved upper surfaces 42b, 42d of ramp member 40, and curved lower surfaces 54a, 54b of sleeve member 50.

Figure 6:
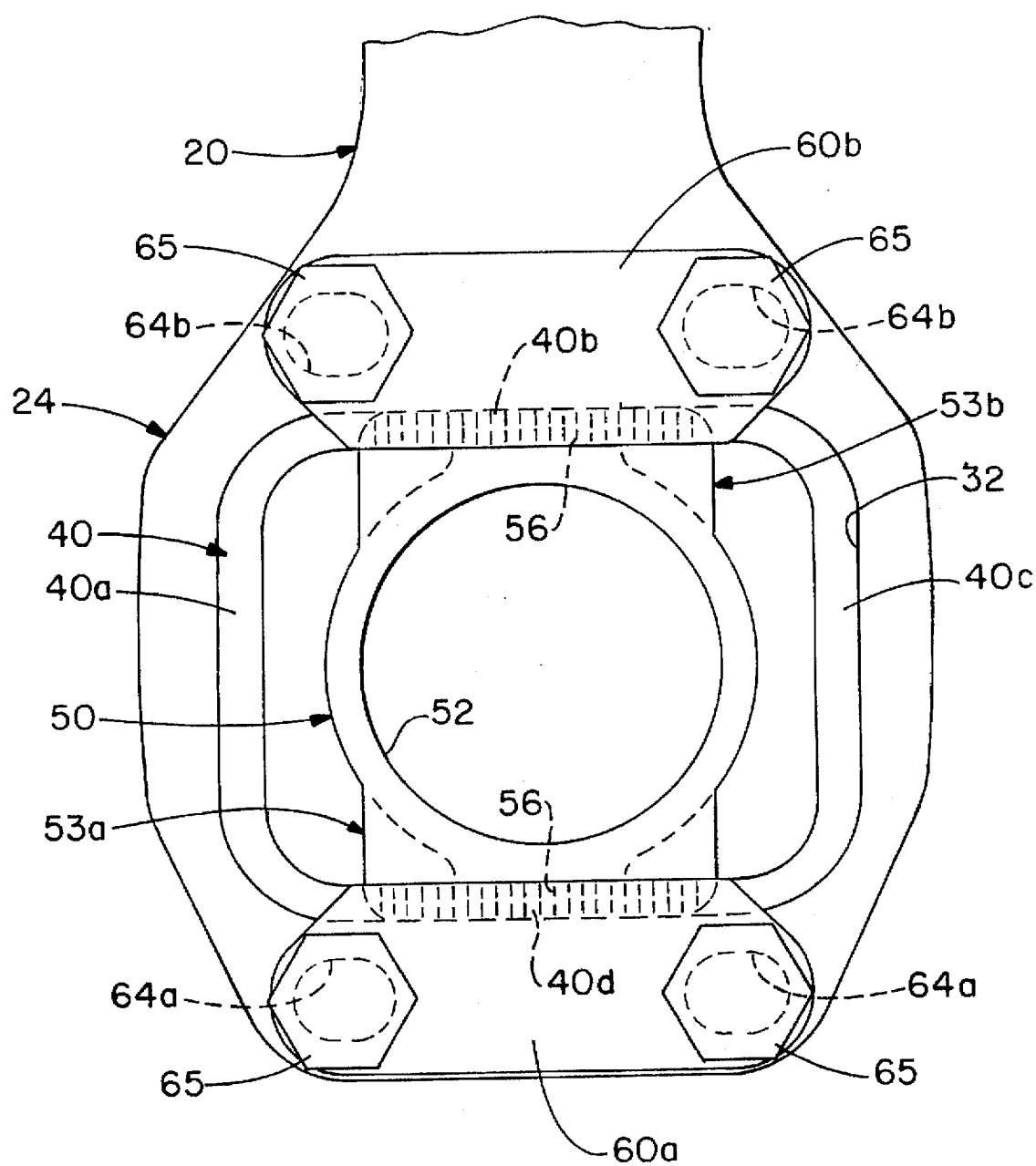
FIG. 6 is a top plan view of the present invention.

Also in the preferred embodiment, clamp members 60a, 60b (FIG. 1) are provided to secure the sleeve member 50 in a desired position relative to ramp member 40. Each of the clamp members 60a and 60b may respectively include teeth 62 for engaging teeth 56 of ball joint assembly sleeve 50. Specifically, teeth 62 of each clamp 60a and 60b are designed to engage at least some teeth 56 of rows 56a and 56b. Clamp members 60a, 60b are designed to hold the various components of the mechanism 30 in position once the proper caster (or camber) angle is obtained by sliding sleeve 50 along ramp member 40, for example as is shown most clearly in FIG. 6, clamp member 60a may include apertures 64a and 64b, being designed to receive threaded members such as bolts or screws 65 that thread into distal region 24 of yoke ear 20 or that receive a nut thereon to fix clamp members 60a, 60b in position relative to yoke ear 20. Teeth 62 of clamp members 60a, 60b engage teeth 56 of sleeve member 50 to fix sleeve member 50 in position on ramp member 40. Adjustment of the mechanism can be performed by loosening the securing members 65, the clamp members 60a, 60b may be loosened to disengage teeth 62 from the teeth 56 formed in association with sleeve member 50. Consequently, the position of sleeve member 50 may be altered within the bore 32 along curved upper surfaces 42b, 42d of ramp member 40. Once the sleeve member 50 is positioned as desired, bolts 65 may be tightened to hold the components in position as described. It should also be evident from the foregoing that the engaging teeth 56 and 62 may alternatively be formed on the upper curved surfaces 42b, 42d of ramp member 40 and the corresponding lower curved surfaces 54b, 54d of sleeve member 50 if desired. The clamp members 60a and 60b may then be tightened onto sleeve member 50 to secure it in the desired position. The invention also contemplates any other suitable structure to maintain sleeve 50 in a desired position relative to ramp member 40 as an alternative to teeth 56 and 62. Also in the preferred embodiment, the apertures 64a and 64b may be elongated to allow the position of clamp members 60a and 60b to be varied in conjunction with and/or separately from sleeve 50 to simplify minor adjustments.

Figure 7:
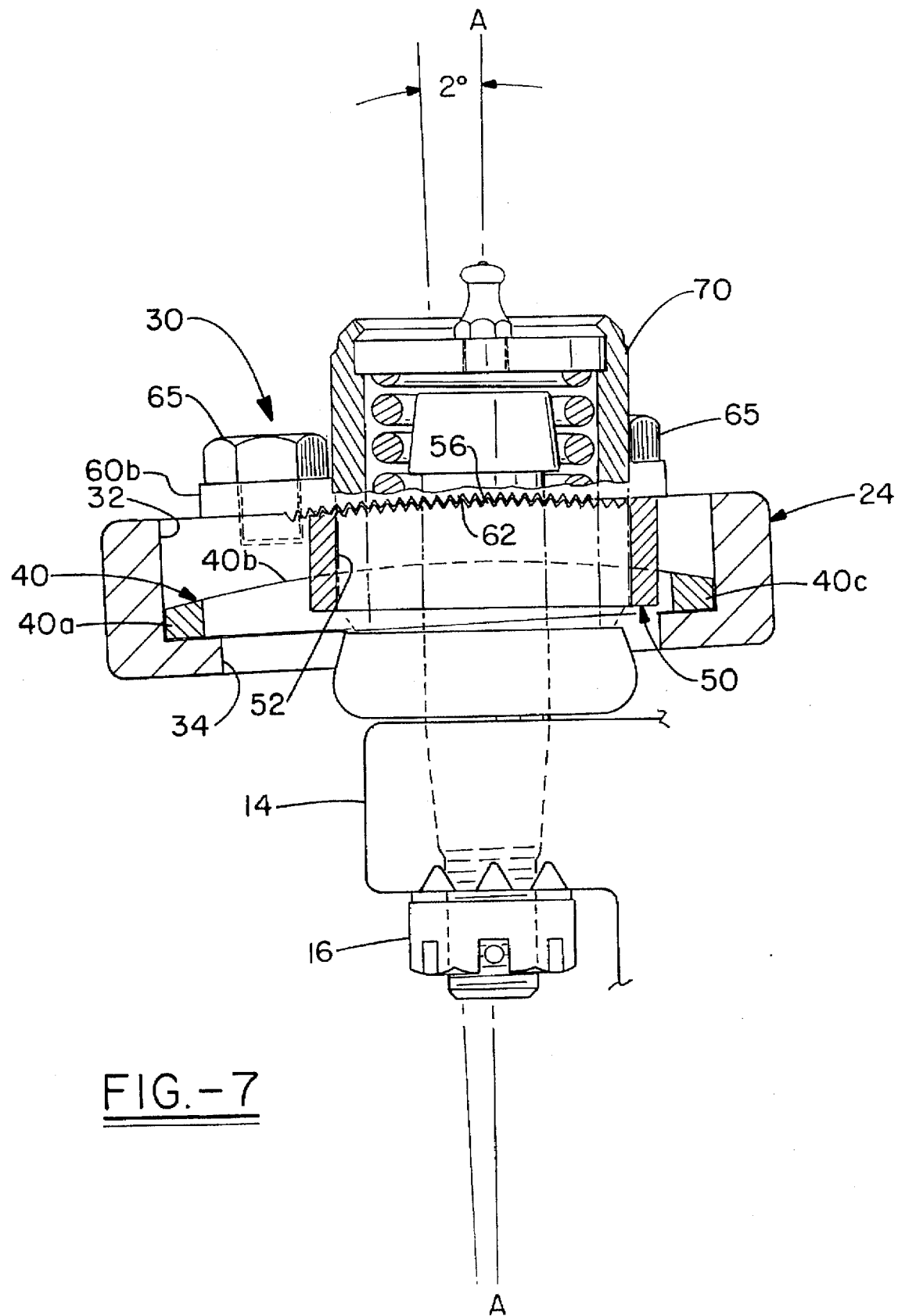
FIG. 7 is a cross-sectional view of the present invention as it may be utilized to adjust the position of a ball joint relative to a tube yoke.

In practice, as is shown in FIG. 7, sleeve member 50 may be positioned on ramp member 40 such that sleeve member is not aligned with the vertical axis V, but is instead aligned with some other steering axis A. Ball joint assembly sleeve 50 includes a bore 52 formed therethrough which receives a ball joint 70 such that a steering knuckle 14 may be secured to ball joint 70 as is known in the art using a nut 16 or other suitable fastener. From the foregoing, it can be seen that movement of ball joint assembly sleeve 50 along curved upper surfaces 42b, 42d of ramp member 40 will move ball joint 70 to any position relative to the vertical axis V, such as a new steering axis A, to thereby adjust caster. As is shown in FIG. 7, caster has been adjusted by a predetermined angle θ utilizing the present invention 30.

The use of curved upper surfaces 42b, 42d of ramp member 40 and curved lower surfaces 54a, 54b of sleeve member 50, with each of the curved surfaces having the same predetermined arc, allows sleeve member 50 to be moved along ramp member 40 to move ball joint 70 off of axis V to a steering axis A without causing undesirable articulation of ball joint 70.

It can be seen from the foregoing that the present invention provides a solution to the above-noted problems associated with beam axles. The present invention provides a simple and effective mechanism that allows caster (or camber, depending upon the orientation of ramp member 40) to be adjusted. Once the components are positioned as described in bore 32 of yoke ear 20 (or yoke ear 22), one need only to loosen bolts 65, slide sleeve member 50 along ramp member 40 to a desired position, either alone or in conjunction with sliding clamp members 60a, 60b, and thereafter fixing the components in position by tightening bolts 65. Also, the present invention may be utilized on both or only one wheel end of a motor vehicle axle. If provided on only one wheel end, the invention provides a mechanism by which the caster of the adjustable wheel end may be set to coincide with the caster of the non-adjustable wheel end to provide a vehicle having uniform caster at each wheel end of an axle.

While the foregoing description has set forth the preferred embodiments of the invention in particular detail, it must be understood that numerous modifications, substitutions and changes can be undertaken without departing from the true spirit and scope of the present invention as defined by the ensuing claims.

What is claimed is:

1. A steerable beam axle for a motor vehicle, said axle adapted on at least one end thereof for adjusting the caster and camber of a steering knuckle attachable thereto by at least one ball joint, said axle comprising:

an axle tube having a yoke member connected to at least one end thereof, said yoke member including upper and lower yoke ears, each of said upper and lower yoke ears including a bore formed therethrough wherein at least one of said bores is enlarged;

a ball joint assembly sleeve for receiving and retaining said at least one ball joint, said ball joint assembly sleeve movably positioned in said at least one enlarged bore;

at least one clamp member for selectively securing said ball joint assembly sleeve in a predetermined variable position within said at least one enlarged bore; and a ramp member supported in said at least one enlarged bore, said ramp member having at least one curved surface to support said ball joint assembly sleeve within said enlarged bore such that said ball joint assembly sleeve is movable relative to said ramp member along an arc defined by said curved surface of said ramp member.

2. The steerable beam axle as recited in claim 1, wherein said upper yoke ear includes said at least one enlarged bore formed therethrough.

3. The steerable beam axle as recited in claim 1, wherein said at least one enlarged bore is a stepped bore.

4. The steerable beam axle as recited in claim 1, wherein said enlarged bore includes opposing sides, and said ramp member includes at least two curved surfaces such that said at least two curved surfaces are located within said enlarged bore on said opposing sides thereof.

5. A steerable beam axle for a motor vehicle, said axle adapted on at least one end thereof for adjusting the caster and camber of a steering knuckle attachable thereto by at least one ball joint, said axle comprising:

an axle tube having a yoke member connected to at least one end thereof, said yoke member including upper and lower yoke ears, each of said upper and lower yoke ears including a bore formed therethrough wherein at least one of said bores is enlarged;

a ball joint assembly sleeve for receiving and retaining said at least one ball joint, said ball joint assembly sleeve movably positioned in said at least one enlarged bore; and at least one clamp member for selectively securing said ball joint assembly sleeve in a predetermined variable position within said at least one enlarged bore;

wherein said ball joint assembly sleeve and said at least one clamp member each include teeth extending therefrom such that said teeth of said ball joint assembly sleeve engage said teeth of said at least one clamp member when said at least one clamp member is positioned to secure said ball joint assembly sleeve.

6. A steerable beam axle for a motor vehicle, said axle adapted on at least one end thereof for adjusting the caster and camber of a steering knuckle attachable thereto by at least one ball joint, said axle comprising:

an axle tube having a yoke member connected to at least one end thereof, said yoke member including upper and lower yoke ears, each of said upper and lower yoke ears including a bore formed therethrough wherein at least one of said bores is enlarged;

a ball joint assembly sleeve for receiving and retaining said at least one ball joint, said ball joint assembly sleeve movably positioned in said at least one enlarged bore;

at least one clamp member for selectively securing said ball joint assembly sleeve in a predetermined variable position within said at least one enlarged bore; and a ramp member provided in said at least one enlarged bore, said ramp member including at least one curved surface for supporting said ball joint assembly sleeve thereon and for defining an arc of movement through which said ball joint assembly sleeve may be moved within said at least one enlarged bore.

7. The steerable beam axle as recited in claim 6, wherein said ball joint assembly sleeve and said at least one clamp member each include teeth extending therefrom such that said teeth of said ball joint assembly sleeve engage said teeth of said at least one clamp member when said at least one clamp member is positioned to secure said ball joint assembly sleeve in position.

8. A steerable beam axle for a motor vehicle, said axle adapted on at least one end thereof for adjusting the caster and camber of a steering knuckle attachable thereto by at least one ball joint, said axle comprising:

an axle tube having a yoke member connected to at least one end thereof, said yoke member including upper and lower yoke ears, each of said upper and lower yoke ears including a bore formed therethrough wherein at least one of said bores is an enlarged rectangular stepped bore;

a ball joint assembly sleeve for receiving and retaining said at least one ball joint, said ball joint assembly sleeve movably positioned in said at least one enlarged bore;

at least one clamp member for selectively securing said ball joint assembly sleeve in a predetermined variable position within said at least one enlarged bore; and a ramp member supported upon a flange within said stepped bore, said ramp member including two curved upper surfaces on opposed sides of said rectangular bore, wherein said ball joint assembly sleeve is supported on said curved upper surfaces of said ramp member for movement along an arc defined by said curved upper surfaces.

9. A steerable beam axle for a motor vehicle, said axle adapted on at least one end thereof for adjusting the caster and camber of a steering knuckle attachable thereto by at least one ball joint, said axle comprising:

an axle tube having a yoke member connected to at least one end thereof, said yoke member including upper and lower yoke ears, each of said upper and lower yoke ears including a bore formed therethrough wherein at least one of said bores is enlarged;

a ball joint assembly sleeve for receiving and retaining said at least one ball joint, said ball joint assembly sleeve movably positioned in said at least one enlarged bore; and at least one clamp member for selectively securing said ball joint assembly sleeve in a predetermined variable position within said at least one enlarged bore, said at least one clamp member including at least one elongated aperture formed therethrough, wherein said at least one clamp member is releasably connected to said yoke member by a securing member extending through said at least one elongated aperture in a predetermined variable position.

10. In combination with a steerable beam axle having a yoke member connected thereto, said yoke member comprising upper and lower yoke ears, a wheel alignment apparatus comprising:

a ball joint assembly sleeve, for receiving and retaining a ball joint, movably connected to at least one of said upper and lower yoke ears, said ball joint assembly sleeve being positioned within a bore formed through said at least one yoke ear such that said ball joint assembly sleeve is movable within said bore;

at least one clamp member for selectively securing said ball joint assembly sleeve in a predetermined position relative to said at least one yoke ear; and a ramp member having at least one curved surface supported within said bore such that said ball joint assembly sleeve is supported on said at least one curved surface of said ramp member for movement along an arc defined by said at least one curved surface.

11. The wheel alignment apparatus as recited in claim 10, wherein said ball joint assembly sleeve and said at least one clamp member each include teeth such that said teeth of said at least one clamp member engage said teeth of said ball joint assembly sleeve when said clamp member is positioned to secure said ball joint assembly sleeve in a predetermined, fixed position relative to said at least one yoke ear.

12. In combination with a steerable beam axle having a yoke member connected thereto, said yoke member comprising upper and lower yoke ears, a wheel alignment apparatus comprising:

a ball joint assembly sleeve, for receiving and retaining a ball joint, movably connected to at least one of said upper and lower yoke ears;

at least one clamp member for selectively securing said ball joint assembly sleeve in a predetermined position relative to said at least one yoke ear;

wherein said ball joint assembly sleeve and said at least one clamp member each include teeth such that said teeth of said at least one clamp member engage said teeth of said ball joint assembly sleeve when said clamp member is positioned to secure said ball joint assembly sleeve in a predetermined, fixed position relative to said at least one yoke ear.

13. In combination with a steerable beam axle having a yoke member connected thereto, said yoke member comprising upper and lower yoke ears, a wheel alignment apparatus comprising:

a ball joint assembly sleeve, for receiving and retaining a ball joint, movably connected to at least one of said upper and lower yoke ears;

at least one clamp member for selectively securing said ball joint assembly sleeve in a predetermined position relative to said at least one yoke ear, said at least one clamp member including an elongated aperture formed therethrough and wherein said at least one clamp member is secured to said at least one yoke ear by a securing member extending through said at least one clamp member, whereby the position of said at least one clamp member relative to said at least one yoke ear may be varied by varying the relative position of said securing member with said elongated aperture.

14. In combination with a steerable beam axle having a yoke member connected thereto, said yoke member comprising upper and lower yoke ears, a wheel alignment apparatus comprising:

a ball joint assembly sleeve, for receiving and retaining a ball joint, movably connected to at least one of said upper and lower yoke ears, said at least one yoke ear having an enlarged stepped bore formed therethrough;

at least one clamp member for selectively securing said ball joint assembly sleeve in a predetermined position relative to said at least one yoke ear; and a ramp member supported within said stepped bore, said ramp member including at least one curved surface, wherein said ball joint assembly sleeve is movably supported upon said at least one curved surface of said ramp member.

15. A method of adjusting the position of a ball joint relative to a yoke ear on a steerable beam axle, the method comprising the steps of:

forming an enlarged bore in said yoke ear;

connecting said ball joint to a sleeve member, said sleeve member movably positioned within said enlarged bore;

varying the position of said sleeve member within said enlarged bore to thereby vary the position of said ball joint relative to said yoke ear;

clamping said sleeve member in a fixed position relative to said yoke ear; and providing a ramp member within said enlarged bore, said ramp member having at least one curved surface to support said sleeve member within said enlarged bore on said at least one curved surface, such that the position of said sleeve member within said bore may be varied by moving said sleeve member from a first position on said at least one curved surface of said ramp member to a second position on said at least one curved surface.

* * * * *